United States Patent
Delker et al.

(10) Patent No.: US 9,398,462 B1
(45) Date of Patent: Jul. 19, 2016

(54) NETWORK ACCESS TIERED BASED ON APPLICATION LAUNCHER INSTALLATION

(71) Applicant: Sprint Communications Company L.P., Overland Park, KS (US)

(72) Inventors: Jason R. Delker, Olathe, KS (US); Drew T. Dennis, Kansas City, MO (US); Cynthia Fung, Kansas City, MO (US); M. Jeffrey Stone, Overland Park, KS (US); Shannon L. Stone, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/639,060

(22) Filed: Mar. 4, 2015

(51) Int. Cl.
*H04W 12/08* (2009.01)
*H04W 4/00* (2009.01)
*H04W 4/12* (2009.01)

(52) U.S. Cl.
CPC .............. *H04W 12/08* (2013.01); *H04W 4/003* (2013.01); *H04W 4/12* (2013.01)

(58) Field of Classification Search
CPC ........ H04W 12/08; H04W 4/003; H04W 4/12
USPC ............................................... 455/411, 414.1
See application file for complete search history.

(56) References Cited

U.S. PATENT DOCUMENTS

| | | | |
|---|---|---|---|
| 6,131,024 A | 10/2000 | Boltz | |
| 6,441,831 B1 | 8/2002 | Abramowitz et al. | |
| 6,445,914 B1 | 9/2002 | Findikli et al. | |
| 6,753,887 B2 | 6/2004 | Carolan et al. | |
| 6,882,290 B2 | 4/2005 | French et al. | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,409,208 B1 | 8/2008 | Clare et al. | |
| 7,493,111 B2 | 2/2009 | Knowles | |
| 7,552,432 B2 | 6/2009 | Aiba | |
| 7,681,134 B1 | 3/2010 | Grechishkin et al. | |
| 7,788,593 B1 | 8/2010 | Grechishkin et al. | |

(Continued)

FOREIGN PATENT DOCUMENTS

| | | |
|---|---|---|
| GB | 2292047 A | 2/1996 |
| KR | 2006039974 A | 5/2006 |

(Continued)

OTHER PUBLICATIONS

Foreign Office Action dated Jul. 7, 2015, Japanese Application Serial No. 2013-543310, filed Jul. 7, 2015.

(Continued)

*Primary Examiner* — Nathan Taylor

(57) ABSTRACT

A mobile communication device. The device comprises a cellular radio transceiver, a processor, a memory, and a custom application launcher stored in the memory. When executed by the processor, the custom application launcher periodically sends a message to an application server, wherein the message informs the application server that the custom application launcher is installed on the mobile communication device and, responsive to initiation of a process of removing the custom application launcher, sends a removal message to the application server, wherein the removal message informs the application server that the custom application launcher is being removed from the mobile communication device.

4 Claims, 9 Drawing Sheets

(56) References Cited

U.S. PATENT DOCUMENTS

| | | |
|---|---|---|
| 7,817,988 B2 | 10/2010 | Kruis et al. |
| 7,904,895 B1 | 3/2011 | Cassapakis et al. |
| 7,991,988 B2 | 8/2011 | Chen |
| 8,107,926 B2 | 1/2012 | Goto |
| 8,185,097 B2 | 5/2012 | Vanderlinden et al. |
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,468,164 B1 | 6/2013 | Paleja et al. |
| 8,571,536 B2 | 10/2013 | Urbanek |
| 8,577,737 B1 | 11/2013 | Amacker et al. |
| 8,612,967 B1 | 12/2013 | Delker |
| 8,626,165 B1 | 1/2014 | Narasimhan et al. |
| 8,650,096 B2 | 2/2014 | Van Buskirk et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 8,938,436 B2 | 1/2015 | Kozempel |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,092,291 B1 | 7/2015 | Adib et al. |
| 9,098,366 B1 | 8/2015 | Adib et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0148598 A1 | 7/2004 | Kita et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1 | 6/2006 | Ganesan |
| 2006/0135144 A1 | 6/2006 | Jothipragasam |
| 2006/0154651 A1 | 7/2006 | Knowles |
| 2006/0168340 A1 | 7/2006 | Heller et al. |
| 2006/0203722 A1 | 9/2006 | Oommen |
| 2006/0208071 A1 | 9/2006 | Chang et al. |
| 2006/0235760 A1 | 10/2006 | Sanjar et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1* | 1/2007 | Wang ............... G06F 9/448 455/558 |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1* | 6/2007 | U. Tenhunen ............ G06F 8/60 |
| 2007/0143740 A1 | 6/2007 | Hoerentrup et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1* | 7/2008 | Srinivas Reddy .. G06Q 30/0603 455/414.1 |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0064055 A1 | 3/2009 | Chaudhri et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0199176 A1 | 8/2009 | Nath et al. |
| 2009/0239518 A1 | 9/2009 | Feuillette |
| 2009/0247124 A1 | 10/2009 | de Atley et al. |
| 2009/0259974 A1* | 10/2009 | Lin ................. H04M 1/72583 715/840 |
| 2009/0260004 A1 | 10/2009 | Datta et al. |
| 2009/0288079 A1 | 11/2009 | Zuber et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1 | 9/2010 | Carolan et al. |
| 2010/0222047 A1 | 9/2010 | Vanderlinden et al. |
| 2010/0262638 A1 | 10/2010 | Fitzgerald |
| 2010/0269107 A1 | 10/2010 | Jung et al. |
| 2010/0291898 A1 | 11/2010 | Sanding et al. |
| 2010/0311404 A1 | 12/2010 | Shi et al. |
| 2010/0311468 A1* | 12/2010 | Shi .................... H04W 4/003 455/558 |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |

(56) References Cited

U.S. PATENT DOCUMENTS

| | | |
|---|---|---|
| 2011/0030062 A1 | 2/2011 | Hsu et al. |
| 2011/0034160 A1 | 2/2011 | Corda et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1 | 8/2011 | Chow et al. |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1 | 12/2011 | Martin et al. |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0054002 A1 | 3/2012 | Rotbard et al. |
| 2012/0072311 A1 | 3/2012 | Khan |
| 2012/0094684 A1 | 4/2012 | Reddy |
| 2012/0106509 A1 | 5/2012 | Klingenbrunn et al. |
| 2012/0129513 A1 | 5/2012 | van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0272178 A1 | 10/2012 | Oygard et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1 | 1/2013 | Dinan |
| 2013/0013671 A1* | 1/2013 | Relan ............... H04L 67/34 709/203 |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1* | 3/2013 | Klemm ............ G06F 17/3089 715/745 |
| 2013/0085914 A1 | 4/2013 | McPherson et al. |
| 2013/0111461 A1 | 5/2013 | Zubas et al. |
| 2013/0184029 A1 | 7/2013 | Lim et al. |
| 2013/0196647 A1 | 8/2013 | Raleigh et al. |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani Rita et al. |
| 2013/0311836 A1 | 11/2013 | Hurst Cameron et al. |
| 2013/0318518 A1 | 11/2013 | Paalanen et al. |
| 2014/0045483 A1 | 2/2014 | Whidden |
| 2014/0068779 A1* | 3/2014 | Tan ................ G06F 21/606 726/26 |
| 2014/0075567 A1 | 3/2014 | Raleigh et al. |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0298320 A1 | 10/2014 | Xu et al. |
| 2014/0342715 A1 | 11/2014 | Gu et al. |
| 2014/0373184 A1 | 12/2014 | Mahaffey et al. |
| 2015/0011311 A1* | 1/2015 | Relan ............... A63F 13/30 463/31 |
| 2015/0017962 A1 | 1/2015 | Howard et al. |
| 2015/0065105 A1 | 3/2015 | Masterson et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1* | 10/2015 | Zhu ............... H04M 15/49 455/406 |
| 2015/0331590 A1* | 11/2015 | Yasui ............... G06F 3/04842 715/765 |
| 2015/0370428 A1* | 12/2015 | Chan ............... H04L 67/1095 715/739 |
| 2016/0094931 A1 | 3/2016 | Urbanek |

FOREIGN PATENT DOCUMENTS

| | | |
|---|---|---|
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 10/2014 |
| WO | WO2015030945 A1 | 3/2015 |
| WO | WO2015060965 A2 | 4/2015 |

OTHER PUBLICATIONS

Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Jul. 15, 2015, U.S. Appl. No. 14/163,041, filed Jan. 24, 2014.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013 [22601].
Foreign Communication From a Related Counterpart Application, International Preliminary Report on Patentability dated Aug. 20, 2015, PCT/US14/13936, filed on Jan. 30, 2014 [28701].
Foreign Communication From a Related Counterpart Application, International Preliminary Report on Patentability dated Aug. 20, 2015, PCT/US14/13939, filed on Jan. 30, 2014 [28801].
Foreign Communication From a Related Counterpart Application, International Preliminary Report on Patentability dated Sep. 24, 2015, PCT/US14/16650, filed on Feb. 16, 2014 [29701].
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle At Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.

(56) References Cited

OTHER PUBLICATIONS

Wikipedia, Extended Display Identification Data, https://en.wikipedia.org/wiki/Extended_Display_Identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Urbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Foreign Communication from a Related Counterpart—International Search Report and Written Opinion, dated Feb. 29, 2012, PCT/US2011/063736, filed on Dec. 7, 2011 [06801].
Foreign Communication from a Related Counterpart Application, "Preliminary Report on Patentability", dated Jun. 20, 2013, PCT/US2011/063736, filed on Dec. 7, 2011 [06801].
Foreign Communication from a Related Counterpart—International Search Report and Written Opinion, dated Jul. 24, 2013, PCT/US13/40278, filed on May 9, 2013 [15901].
Foreign Communication from a Related Counterpart—International Search Report and Written Opinion, dated Nov. 14, 2013, PCT/US13/55023, filed on Aug. 15, 2013 [16801].
Foreign Communication from a Related Counterpart—International Preliminary Report on Patentability, dated Apr. 2, 2015, PCT/US13/55023, filed on Aug. 15, 2013 [16801].
Foreign Communication From a Related Counterpart Application, International Search Report and Written Opinion dated Jan. 24, 2014, PCT/US13/68981, filed on Nov. 7, 2013 [22601].
Foreign Communication from a Related Counterpart—International Search Report and Written Opinion, dated May 19, 2014, PCT/US14/13936, filed on Jan. 30, 2014 [28701].
Foreign Communication from a Related Counterpart—International Search Report and Written Opinion, dated May 14, 2014, PCT/US14/13939, filed on Jan. 30, 2014 [28801].
Foreign Communication from a Related Counterpart—International Search Report and Written Opinion, dated Jun. 3, 2014, PCT/US14/16650, filed on Feb. 16, 2014 [29701].
Foreign Communication from a Related Counterpart Application, "Preliminary Report on Patentability," dated Nov. 20, 2014, PCT/US13/40278, filed on May 9, 2013 [15901].
Foreign Communication from a Related Counterpart—International Search Report and Written Opinion, dated Dec. 17, 2014, PCT/US14/46773, filed on Jul. 16, 2014 [36501].
Foreign Communication from a Related Counterpart—International Search Report and Written Opinion, dated Dec. 30, 2014, PCT/US14/56778, filed on Sep. 22, 2014 [35501].
Delker, Jason R., "Loading Branded Media Outside System Partition," filed Oct. 30, 2013, U.S. Appl. No. 14/066,947.
Mauer, Brian D., et al., "Automatic Branding of Generic Applications," filed Jan. 10, 2013, U.S. Appl. No. 14/152,627.
Spanel, Robert L., et al., "Dynamic Remotely Managed SIM Profile," U.S. Appl. No. 14/522,586, filed Oct. 24, 2014.
Annan, Brandon C., et al., "System and Method of Branding and Labeling a Mobile Device," filed Mar. 15, 2013, U.S. Appl. No. 13/844,104.
Annan, Brandon C., et al., "Electronic Fixed Brand Labeling," filed Feb. 8, 2013, U.S. Appl. No. 13/763,443.
Ghoshal, Jagannath, et al., "Rebranding a Portable Electronic Device While Maintaining User Data," filed May 22, 2013, U.S. Appl. No. 13/899,567.
Ghoshal, Jagannath, et al., "System and Method for Retrofitting a Branding Framework into a Mobile Communication Device," filed May 21, 2013, U.S. Appl. No. 13/899,566.
Urbanek, Robert E., "Delivery of Branding Content and Customizations to a Mobile Communication Device," filed Oct. 23, 2013, U.S. Appl. No. 14/060,712.
Urbanek, Robert E., "Delivery of Branding Content and Customizations to a Mobile Communication Device," filed Sep. 22, 2014, International Serial No. PCT/US14/56778.
Urbanek, Robert E., "Implementation of Remotely Hosted Branding Content and Customizations," filed Oct. 23, 2013, U.S. Appl. No. 14/085,474.
Urbanek, Robert E. "Subscriber Identity Module Virtualization," filed Nov. 20, 2013, U.S. Appl. No. 14/060,719.
Indurkar, Dhananjay, "System and Method of Branding a Device Independent of Device Activation," filed Jan. 24, 2014, U.S. Appl. No. 14/163,035.
Sumner, Bret D., "Directing Server Connection Based on Location Identifier," filed Aug. 15, 2013, U.S. Appl. No. 13/968,259.
Abou-El-Ella, Hassan, et al., "Segmented Customization Payload Delivery," filed Aug. 27, 2013, U.S. Appl. No. 14/010,518.
Sumner, Bret D., "Segmented Customization Package Within Distributed Server Architecture," filed Aug. 27, 2013, U.S. Appl. No. 14/010,522.
Masterson, Michelle E., et al., "Development and Testing of Payload Receipt by a Portable Electronic Device," filed Aug. 27, 2013, U.S. Appl. No. 14/010,523.
Callan, Jeffery S., et al., "Delivery of Oversized Branding Elements for Customization," filed Nov. 6, 2013, U.S. Appl. No. 14/073,321.
Indurkar, Dhananjay, "Background Delivery of Device Configuration and Branding," filed Jan. 16, 2014, U.S. Appl. No. 14/157,507.
Ahn, Chul Jin, et al., "Separation of Client Identification Composition from Customization Payload to Original Equipment Manufacturer Layer," filed Nov. 8, 2013, U.S. Appl. No. 14/075,687.
Ghoshal, Jagannath, et al., "Multiple Carrier Partition Dynamic Access on a Mobile Device," filed Jun. 5, 2014, U.S. Appl. No. 14/297,429.
Indurkar, Dhananjay, "Activation Sequence Using Permission Based Connection to Network," filed Jan. 24, 2014, U.S. Appl. No. 14/163,041.
Ahn, Chul Jin, et al., "Customization for Preloaded Applications," filed Mar. 31, 2014, U.S. Appl. No. 14/231,718.
Koller, Gary D., et al., "Out of the Box Experience (OOBE) Country Choice Using Wi-Fi Layer Transmission," filed Oct. 31, 2014, U.S. Appl. No. 14/530,666.
Blinn, Benjamin P., et al. "System and Method of Efficient Mobile Device Network Brand Customization," filed Sep. 2, 2014, U.S. Appl. No. 14/475,399.
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.

(56) References Cited

OTHER PUBLICATIONS

FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
Notice of Allowance dated Apr. 26, 2012, U.S. Appl. No. 12/962,620, filed Dec. 7, 2010.
Notice of Allowance dated Nov. 2, 2012, U.S. Appl. No. 13/556,202, filed Jul. 24, 2012.
Notice of Allowance dated Jun. 11, 2013, U.S. Appl. No. 13/752,386, filed Jan. 28, 2013.
FAIPP Pre-Interview Communication dated Feb. 25, 2013, U.S. Appl. No. 13/149,505, filed May 31, 2013.
First Action Interview Office Action dated May 8, 2013, U.S. Appl. No. 13/149,505, filed May 31, 2013.
Notice of Allowance dated Aug. 9, 2013, U.S. Appl. No. 13/149,505, filed May 31, 2013.
FAIPP Pre-Interview Communication dated Sep. 22, 2014, U.S. Appl. No. 13/468,028, filed May 9, 2013.
First Action Interview Office Action dated Mar. 16, 2015, U.S. Appl. No. 13/468,028, filed May 9, 2013.
FAIPP Pre-Interview Communication dated Aug. 13, 2013, U.S. Appl. No. 13/335,941, filed Dec. 23, 2011.
Notice of Allowance dated Oct. 9, 2013, U.S. Appl. No. 13/335,941, filed Dec. 23, 2011.
FAIPP Pre-Interview Communication dated Apr. 23, 2014, U.S. Appl. No. 13/622,234, filed Sep. 18, 2012.
Final Office Action dated Sep. 19, 2014, U.S. Appl. No. 13/622,234, filed Sep. 18, 2012.
Advisory Action dated Dec. 17, 2014, U.S. Appl. No. 13/622,234, filed Sep. 18, 2012.
Office Action dated Mar. 2, 2015, U.S. Appl. No. 13/622,234, filed Sep. 18, 2012.
FAIPP Pre-Interview Communication dated Mar. 19, 2014, U.S. Appl. No. 13/744,847, filed Jan. 18, 2013.
Notice of Allowance dated Aug. 4, 2014, U.S. Appl. No. 13/744,847, filed Jan. 18, 2013.
FAIPP Pre-Interview Communication dated Mar. 26, 2015, U.S. Appl. No. 14/522,586, filed Oct. 24, 2014.
FAIPP Pre-Interview Communication dated Jul. 16, 2014, U.S. Appl. No. 13/744,861, filed Jan. 18, 2013.
Notice of Allowance dated Nov. 20, 2014, U.S. Appl. No. 13/744,861, filed Jan. 18, 2013.
FAIPP Pre-Interview Communication dated Apr. 8, 2015, U.S. Appl. No. 13/844,104, filed Mar. 15, 2013.
FAIPP Pre-Interview Communication dated Oct. 22, 2014, U.S. Appl. No. 13/763,428, filed Feb. 8, 2013.
Notice of Allowance dated Mar. 20, 2015, U.S. Appl. No. 13/763,428, filed Feb. 8, 2013.
FAIPP Pre-Interview Communication dated Apr. 3, 2014, U.S. Appl. No. 13/763,434, filed Feb. 8, 2013.
Final Office Action dated Aug. 19, 2014, U.S. Appl. No. 13/763,434, filed Feb. 8, 2013.
Notice of Allowance dated Mar. 26, 2015, U.S. Appl. No. 13/763,434, filed Feb. 8, 2013.
Office Action dated Aug. 7, 2014, U.S. Appl. No. 13/831,504, filed Mar. 14, 2013.
Notice of Allowance dated Dec. 29, 2014, U.S. Appl. No. 13/831,504, filed Mar. 14, 2013.
FAIPP Pre-Interview Communication dated Nov. 20, 2014, U.S. Appl. No. 13/899,566, filed May 21, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
Pre-Interview Communication dated Apr. 8, 2015, U.S. Appl. No. 14/157,507, filed Jan. 16, 2014.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.
Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Office Action dated Oct. 1, 2015, U.S. Appl. No. 14/701,156, filed Apr. 30, 2015.
FAIPP Pre-Interview Communication dated Aug. 25, 2014, U.S. Appl. No. 13/940,251, filed Jul. 11, 2013.
First Action Interview Office Action dated Oct. 17, 2014, U.S. Appl. No. 13/940,251, filed Jul. 11, 2013.
Notice of Allowance dated Mar. 9, 2015, U.S. Appl. No. 13/940,251, filed Jul. 11, 2013.
FAIPP Pre-Interview Communication dated Aug. 25, 2014, U.S. Appl. No. 13/940,253, filed Jul. 11, 2013.
First Action Interview Office Action dated Oct. 17, 2014, U.S. Appl. No. 13/940,253, filed Jul. 11, 2013.
Notice of Allowance dated Mar. 6, 2015, U.S. Appl. No. 13/940,253, filed Jul. 11, 2013.
FAIPP Pre-Interview Communication dated Jul. 24, 2015, U.S. Appl. No. 14/168,007, filed Jan. 30, 2014.
Mehrotra, et al., "SenSocial: a Middleware for Integrating Online Social Networks and Mobile Sensing Data Streams," ACM, Middleware '14, Dec. 8-12, 2014, Bordeaux, France.
Fultz, David K., et al., "Virtual Preloads," filed Jan. 30, 2014, U.S. Appl. No. 14/168,007.
Schwermann, Nathan M., et al., entitled, "Methods for Customization of Default Applications on a Mobile Communication Device," filed Apr. 30, 2015, U.S. Appl. No. 14/701,156.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.

(56) References Cited

OTHER PUBLICATIONS

Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
Final Office Action dated Jan. 12, 2016, U.S. Appl. No. 14/163,041, filed Jan. 24, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Foreign Communication from a Related Counterpart—International Preliminary Report on Patentability, dated Mar. 10, 2016, PCT/US14/46773, filed on Jul. 16, 2014.
Foreign Communication from a Related Counterpart—International Search Report and Written Opinion, dated Apr. 4, 2016, PCT/US16/13272, filed on Jan. 13, 2016.
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.
Final Office Action dated Jan. 28, 2016, U.S. Appl. No. 14/168,007, filed Jan. 30, 2014.
Advisory Action dated Mar. 29, 2016, U.S. Appl. No. 14/168,007, filed Jan. 30, 2014.
Final Office Action dated Feb. 8, 2016, U.S. Appl. No. 14/701,156, filed Apr. 30, 2015.

* cited by examiner

NETWORK ACCESS TIERED BASED ON APPLICATION LAUNCHER INSTALLATION

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An application launcher presents the main display view of a mobile communication device (e.g., the presentation of controls and icons on the color graphics display of a smart phone) and is responsible for starting applications and hosting live widgets. Typically application launchers are installed in devices by the original equipment manufacturer, possibly as a component of a mobile device operating system. In some mobile communication devices (e.g., an unlocked smart phone) a user can replace application launchers.

Access to data communication networks by mobile communication devices may be brokered by media access gateways (MAGs). The mobile device may receive a wireless link from a base transceiver station (BTS) or Enhanced Node B (eNB) to gain access to a radio access network, and the BTS or eNB may route the data network access request to the MAG for processing and potentially for forwarding into the data network.

SUMMARY

In an embodiment, a method of managing tiered access to a data network is disclosed. The method comprises receiving by a server computer a first request from a first mobile communication device to access a data network, comparing a first identity associated with the first mobile communication device to an access white list by the server computer, and responsive to finding an entry associated with the first mobile communication device in the access white list, the server computer forwarding the first request based on one of a uniform resource locator (URL) or a network address contained in the first request. The method further comprises receiving by the server computer a second request from a second mobile communication device to access the data network and comparing a second identity associated with the second mobile communication device to the access white list by the server computer. The method further comprises, responsive to not finding an entry associated with the second mobile communication device in the access white list and determining that the second request does not comprise a URL of a custom application launcher installation application server, the server computer restricting access by the second mobile communication device to the data network.

In an embodiment, a mobile communication device is disclosed. The device comprises a cellular radio transceiver, a processor, a memory, and a custom application launcher stored in the memory. When executed by the processor, the custom application launcher periodically sends a message to an application server, wherein the message informs the application server that the custom application launcher is installed on the mobile communication device and, responsive to initiation of a process of removing the custom application launcher, sends a removal message to the application, wherein the removal message informs the application server that the custom application launcher is being removed from the mobile communication device.

In an embodiment, another method of managing tiered access to a data network is disclosed. The method comprises receiving by a server computer a request from a mobile communication device to access a data network, comparing an identity associated with the mobile communication device to an access white list by the server computer, and, responsive to not finding an entry associated with the mobile communication device in the access white list and determining that the request does not comprise a URL of a custom application launcher installation application server, the server computer forwarding the request to a web site that returns a web page to the mobile communication device, where the web page provides a first interface control to select installation on the mobile communication device of a custom application launcher from the custom application launcher installation application server and a second interface control to select payment of a fee in lieu of installing the custom application launcher on the mobile communication device. The method further comprises receiving by a second server computer a message selecting payment of the fee in lieu of installing the custom application launcher from the mobile communication device and, responsive to receiving the message selecting payment of the fee, the second server updating the white list with an entry associated with the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
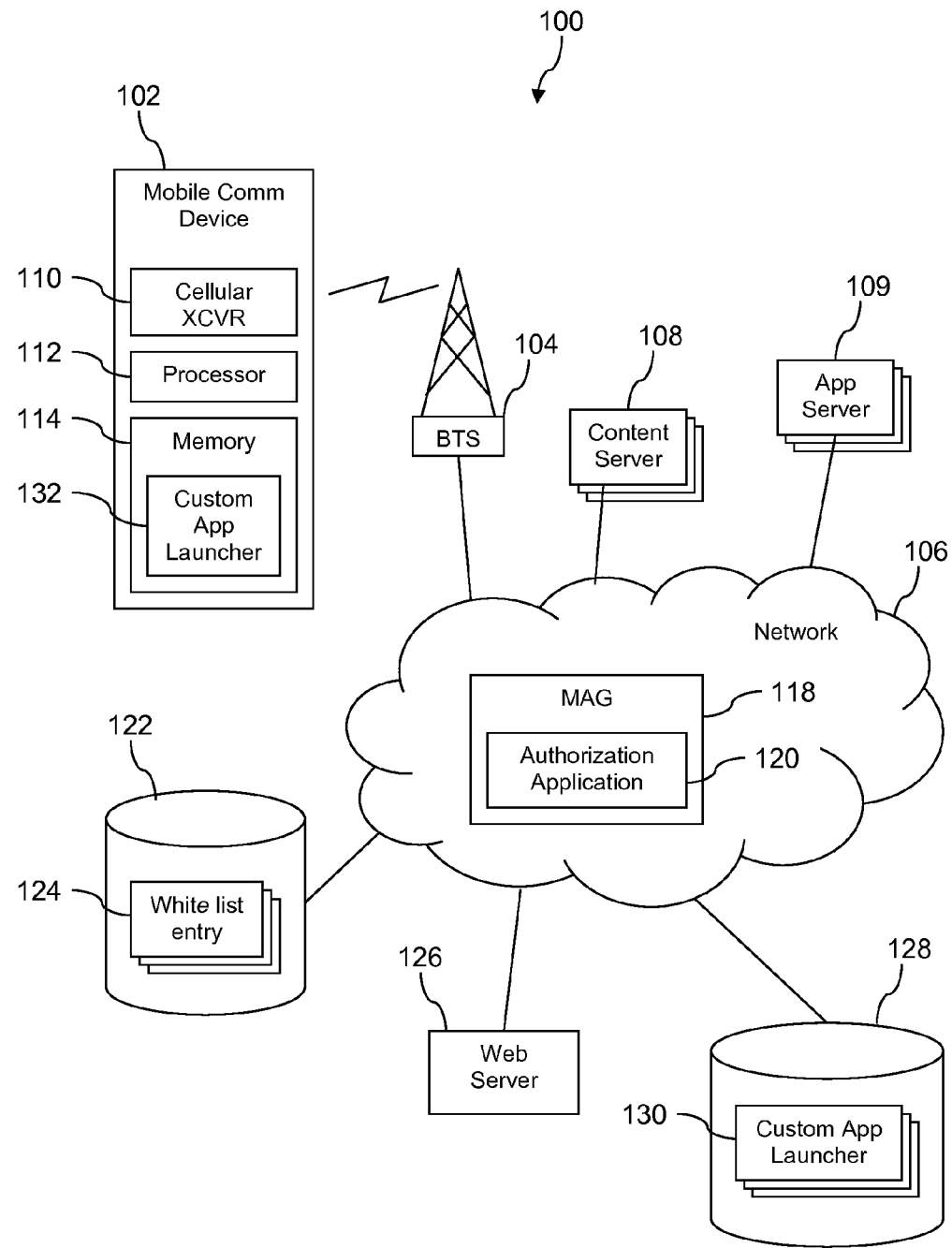
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches providing access of a mobile communication device to a data network based on whether or not the device has installed a custom application launcher. When the device sends a request to access the data network (e.g., sends a content request from a web browser executing on the device directed to a uniform resource locator (URL) associated with a content server connected to the Internet), a media access gateway (MAG) searches a white list for an entry associated with the mobile communication device. If there is an entry for the device in the white list, the MAG forwards the content request to the data network. If there is no entry in the white list for the device, and if the service or Web site that the device is seeking to access is not allowed or white listed by the MAG, the MAG retrieves a custom application launcher installation web page from a web server and returns that web page to the mobile communication device. The web browser of the device renders the web page which provides one or more controls associated with downloading and installing a custom application launcher on the device. The uniform resource locator (URL) of the web page that promotes downloading the custom application launcher may be allowed and/or white listed by the MAG, so that non-white listed devices can still access that web site to download the custom application launcher. In an embodiment, the custom application launcher may be a custom Android application launcher.

One selection or control in the web page allows the user of the device to select downloading and installation of a custom application launcher. As is typical of any application launcher, the custom application launcher presents the main display view of a mobile communication device, starts applications, and hosts live widgets. The custom application launcher described herein further promotes downloading and installing one or more customization items and/or pre-installation stub applications, as described further below. For more details about custom application launchers, see U.S. patent application Ser. No. 14/639,056, filed Mar. 4, 3015, entitled "Subscriber Identity Module (SIM) Card Initiation of Custom Application Launcher Installation on a Mobile Communication Device," by Jason R. Delker, et al., is incorporated herein by reference in its entirety.

When this control is selected, the web browser sends a request out to a data store or repository of custom application launchers, a suitable custom application launcher is identified, the custom application launcher is downloaded to the device, and the custom application launcher is installed and activated on the device. An identity of the device is added to the white list.

In an embodiment, the custom application launcher replaces a previously installed and/or active application launcher, for example an application launcher installed by an original equipment manufacturer (OEM) of the mobile communication device. In an embodiment, the previously installed application launcher may remain stored in memory of the mobile communication device in a dormant and/or inactive state. In another embodiment, the previously installed application launcher is deleted from the memory of the mobile communication device.

In an embodiment, if the user of the mobile communication device does not select installation of the custom application launcher, every time an attempt is made by the device to access the data network, the MAG follows the process described above, presenting the web page supporting downloading the custom application launcher. Said in other words, in an embodiment, the MAG blocks all attempts to access the data network by devices that do not install the custom application launcher. Alternatively, the MAG may grant access of a mobile communication device to the data network at a restricted performance level (e.g., at a reduced throughput rate and/or as a lower tier of traffic), grant access of the mobile communication device to a restricted portion of the data network (e.g., an enumerated set of content servers and/or web servers and/or address domains), and/or grant access to the data network for a restricted class of content (for example excluding content corresponding to video files). If restricted performance level is selected, an identity of the device may be written into the white list with an indication of the restriction.

In another embodiment, the web page provides additional selections and/or controls that the user may select to gain top tier access to the data network, without selecting downloading and installation of the custom application launcher, in exchange for agreeing to pay a surcharge for accessing the data network. In this case, the identity of the device may be written into the white list with an indication of the surcharge option and when the payment was last made. As payments are made, the payment data may be updated in the white list. When the MAG finds the entry for the device in the white list it may determine if the surcharge has been paid for the current operating period, and if the surcharge has not been paid, the device request to access the data network may be treated as if the device were not white listed. For example, the request may be serviced with a treatment that results in presentation of a message on the device indicating the surcharges are in arrears and providing instructions on how to complete a payment to restore previous data network access services. If the surcharge has not been paid for an extended period of time, for example longer than a predefined threshold of time, the entry for the device may be removed from the white list.

In some wireless communication service markets, for example in some undeveloped or developing nations, the margins for providing wireless communication services are extremely thin. Installation of the custom application launcher on a device may provide a wireless communication service provider with some revenue enhancement opportunities to offset a very low monthly wireless communication service fee. Without the installation of that custom application launcher, and hence lacking that revenue enhancement opportunity, the carrier may alternatively offer the subscriber the option of paying a surcharge for data network access to avoid installation of the custom application launcher.

Turning now to FIG. 1, a communication system 100 is described. In an embodiment, the system 100 comprises a mobile communication device 102, a base transceiver station 104 (or an enhanced node B [eNB]), a network 106, a content server 108, and an application server 109. The mobile communication device 102 may be a mobile phone, a smart phone, a media player, a personal digital assistant (PDA), a wearable computer, or a headset computer. The mobile communication device 102 comprises a cellular radio transceiver 110, a processor 112, and a memory 114. The mobile communication device 102 may establish wireless communication links with the BTS 104 using one or more of a code division multiple access (CDMA) protocol, a global system for mobile communication (GSM) protocol, a long term evolution (LTE) protocol, and a worldwide interoperability for microwave access (WiMAX) protocol.

The BTS 104 may communicatively couple the device 102 to the network 106 and there through to the content server 108 and/or to the application server 109. In an embodiment, the system 100 further comprises a media access gateway (MAG) 118 and a data store 122 that comprises white list entries 124. In some contexts, the white list entries 124 may be said to comprise a white list or an access white list. The MAG 118 may be considered to be part of the network 106 but is illustrated explicitly to more clearly illustrate and describe the functioning of one or more of the embodiments of the disclosure. The MAG 118 may be coupled to the BTS 104 and may be engaged as a gateway between the radio access network (RAN), represented by the BTS 104, and the remainder of the network 106. The MAG 118 may comprise an authorization application 120 that processes requests of the device 102 to access the network 106, specifically to access the data network (e.g., to access the content server 108 and/or the application server 109). The system 100 may also comprise a web server 126 and a custom application launcher database 128 that comprises custom application launchers 130.

Figure 2:
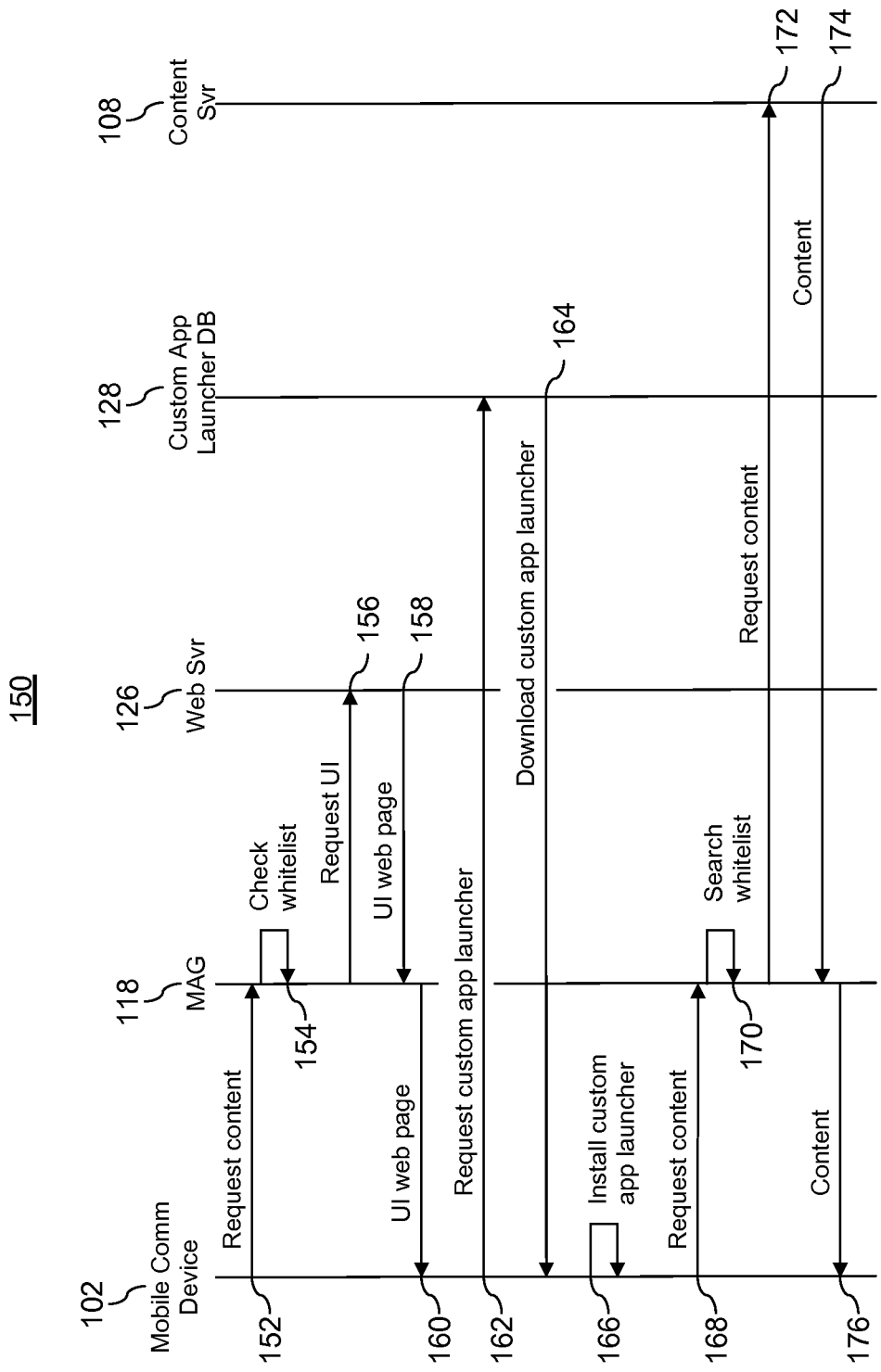
FIG. 2 is a message sequence diagram according to an embodiment of the disclosure.

Turning now to FIG. 2, a message sequence 150 is described. Label numbers indexing messages illustrated in FIG. 2 are referenced in the following description by corresponding numbers within parentheses. When the MAG 118 receives a request (152) from the device 102 to access the data network, the authorization application 120 searches (152) the data store 122 for a white list entry 124 that corresponds to the device 102. For example, the authorization application 120 indexes into a list or table of white list entries 124 using one or more of a mobile equipment identity (MEID), a mobile directory number (MDN), or another identifier associated with the device 102. If no entry associated with the device 102 is found, the authorization application 120 may forward the request (156) from the device 102 to the web server 126. The web server 126 returns a response (158) that comprises a web page to the MAG 118, and the MAG 118 returns the response (160) containing the web page to the mobile communication device 102. Alternatively, the web server 126 may return the response comprising the web page to the device 102 without passing through the MAG 118.

The browser of the device 102 renders the web page which causes a user interface or a graphical user interface to be displayed on the device 102. The user interface (UI) provides a selection control for downloading to and installing on the device 102 a custom application launcher 130 from the custom application launcher database 128. When the control is selected, the web browser sends a request (162) for the custom application launcher 130, a suitable custom application launcher 130 is selected (e.g., selected by an application server 109 based on information about the device 102 such as a device model and/or an operating system version number), the custom application launcher 130 is downloaded (164) to the device 102 and installed (166) on the device 102 as a custom application launcher 132.

The custom application launcher 132 may install various customization items onto the mobile communication device 102 when the custom application launcher 132 is first executed on the mobile communication device 102. The customization items may comprise one or more of a display wallpaper for the mobile communication device, a mobile communication service provider logo to present on the mobile communication device, a power-on video animation for the mobile communication device, a power-off video animation for the mobile communication device, a ringtone for the mobile communication device, one or more audible prompts (e.g., text message arrival audible prompt, email arrival audible prompt, etc.), a phone number or a short code of a customer care service associated with the mobile communication service provider, and a link to an applications store associated with the mobile communication service provider. In an embodiment, the customization application launcher 132 is further configured to download and to install one or more virtual pre-installation stub applications on the mobile communication device 102 when the customization application launcher 132 is first executed on the mobile communication device 102. For further details about virtual pre-installed applications and virtual pre-installation stub applications, see U.S. patent application Ser. No. 13/940,251, filed Jul. 11, 2013, entitled "Virtual Pre-Installation of Applications," by Fared A. Adib, et al., and U.S. patent application Ser. No. 13/940,253, filed Jul. 11, 2013, entitled "Dynamic Updating and Renaming Virtual Pre-Installation Stub Applications," by Fared A. Adib, et al., both of which are incorporated herein by reference in their entireties. The customization application launcher 132 can also be used to update customization items, to update pre-installation stub applications, and/or to replace pre-installation stub applications.

It is understood that the request and response for the custom application launcher 130 may be supported in different ways. For example, the device 102 may send the request to an application server 109 identified by the web page, the application server 109 may determine the appropriate custom application launcher 130 based on a device model and/or an operating system version of the device 102, the application server 109 may retrieve a copy of the subject custom application launcher 130 from the custom application launcher database 128, and the application server 109 may transmit the custom application launcher to the device 102. Alternatively, the role attributed to the application server 109 could be performed by the web server 126. Alternatively, the user selection of the control in the web page for downloading and installing the custom application launcher 130 itself may identify the custom application launcher database 128 and the specific custom application launcher 130, the request may be sent by the web browser of the device 102 to a server (not shown) mediating access to the custom application launcher database 128, and that server may send the response containing the custom application launcher 130 to the device 102. In some contexts, the device and/or functionality associated with any of these methods of delivery of the custom application launcher 130 may be referred to as a custom application launcher installation application server. For example, the application server 109 that, according to one embodiment, provides the custom application launcher 130 to the device 102 may be referred to in some contexts as a custom application launcher installation application server.

When the custom application launcher 132 is installed on the device 102, a white list entry 124 associated with the device 102 is created in the data store 122. In an embodiment, the custom application launcher 132, when it is first executed on the device 102, triggers or commands the creation of the new white list entry 124 associated with the device 102. Alternatively, in another embodiment, another system may command creation of the white list entry 124 associated with the device 102, for example the application server 109 that selected and downloaded the custom application launcher 132 or the MAG 118.

When the user of the device 102 attempts to access the content server 108 or the application server 109 again, after downloading and installing the custom application launcher 132, by sending a content request (168) to the MAG 118, the authorization application 120 searches (170) the white list entries 124 based on the identity of the device 102, now discovers an entry corresponding to the device 102 (said in other words, the authorization application 120 determines that the device 102 is "white listed"), and grants access of the device 102 to the data network and hence to access the content server 108 or the application server 109. The MAG 118 forwards (172) the content request to the content server 108 identified in the request, the content server 108 returns (174) the content to the MAG 118, and the MAG 118 forwards (176) the content to the device 102 where the content is rendered by the web browser of the device 102. Alternatively, the MAG 118 may forward (172) the request to a network address (e.g., an Internet Protocol address) contained in the request.

It is understood that the device 102 may equally request a web service that may pass from the device 102 to the MAG 118. After searching (170) the white list entries 124 and confirming the white listing of the device 102, the MAG 118 may forward the request to a web server 126. The web server 126 may process the request in part by requesting services provided by one or more application servers 109. The web server 126 may collate, combine, or otherwise bundle together the responses from the one or more application servers 109, and return the bundled response to the device 102.

In an embodiment, the custom application launcher 132 periodically reports on its installation status to the authorization application 120 or to an application server 109 responsible for maintaining the white list entries 124. For example, the custom application launcher 132 may send a message indicating its installation status on a daily periodic basis, a weekly periodic basis, or a monthly periodic basis. Alternatively, the custom application launcher 132 may send a message indicating its installation status on some other periodic interval. The custom application launcher 132 may send the installation status message on about the periodic interval but randomly varied by some amount of time, so that the system 100 does not experience a troublesome peak of receiving such installation status messages all at the same time. For example, the custom application launcher 132 may send the installation status message at a time that is randomly varied based on a pseudorandom number generated from a seed value related to an identity of the device 102. The variation may be restricted within a range of plus or minus some period of time, such as plus or minus 10 minutes, plus or minus 30 minutes, plus or minus an hour, or some other time interval.

Alternatively, the custom application launcher 132 may report its installation status in response to launching an application that is capable of attempting to access the data network, for example the first time each day, the first time each week, or the first time each month that any application capable of attempting to access the data network is launched by the custom application launcher 132. The custom application launcher 132 may asynchronously send a message to the system 100, for example to the application server 109 responsible for maintaining the white list entries 124 or to the authorization application 120, on the event of the user of the device 102 uninstalling the custom application launcher 132.

The custom application launcher 132 may desirably be installed as the default (i.e., the active) launcher on the device 102. In an embodiment, the custom application launcher 132 is configured to listen for all application launcher events on the device 102 and on such events query the operating system of the device 102 to confirm that the custom application launcher 132 is the default launcher. If it determines it is not the default launcher, the custom application launcher 132 can asynchronously (i.e., responsive to the event) send a message to the application server 109 to remove the device 102 from the white list 124. In an embodiment, the custom application launcher 132 may also present a message on the display of the device 102 to alert the user that the custom application launcher 102 is no longer the default and that some functionality may not be available. This approach may provide immediate feedback to the system 100 when the custom application launcher 102 is reconfigured as other than the active application launcher.

The application server 109 that is responsible for maintaining the white list entries 124 may periodically groom the white list entries 124, removing entries associated with devices 102 and/or custom application launchers 132 that have not timely reported installation status. The application server 109 may maintain and update a list of custom application launchers 132 every time an installation status update is received. Alternatively, the application server 109 may write a field or column in the white list entries 124 indicating the most recent installation status confirmation. The application server 109 may then traverse the white list entries 124 periodically and remove all those entries that have an installation status update value that is not current. The application server 109 responsible for maintaining the white list entries 124 may also remove an entry of a specific device 102 when the associated custom application launcher 132 sends a deinstallation message.

In an embodiment, the web page returned by the web server 126 provides an additional selection control offering the option of providing full access to the data network, based on paying a periodic surcharge on a mobile communication service account in lieu of installing the custom application launcher 132. When the user selects this surcharge control, the application server 109 responsible for maintaining the white list entries 124 may create a new white list entry 124 associated with the device 102, where the new white list entry 124 indicates that the surcharge payment option was selected. When grooming and/or traversing the white list entries 124, the application server 109 may delete white list entries 124 that are associated with the surcharge payment option where payment of the surcharge is not up to date.

In an embodiment, the web page returned by the web server 126 may provide an additional selection control declining to install the custom application launcher 130. When the user selects the control declining installation of the custom application launcher 130, the application server 109 responsible for maintaining the white list entries 124 may create a new white list entry 124 associated with the device 102 that indicates the installation of the custom application launcher 130 was declined or that the custom application launcher 130 was deinstalled. When the MAG 118 or the authorization application 120 receives a request to access the data network by the device 102, locates a white list entry 124 associated with the device 102, and determines that the device 102 declined to install the custom application launcher 130 or has deinstalled the custom application launcher 132, the MAG 118 may forward the request to access the data network with an indication of data network quality of service level that designates a diminished quality of service level or a lower tier of service for the device 102.

For example, the device 102 may be allocated bandwidth on the network 106 based on a level of network congestion. When the network 106 operating below a threshold level of congestion, the device may be allocated a higher bandwidth than when the network 106 is operated above a threshold level of congestion. Alternatively, the device 102 may be allocated a fixed amount of bandwidth on the network 106 that is less than the bandwidth allocated to devices that have selected to install the custom application launcher 130. In an embodiment, the white list entry 124 indicating that the custom application launcher 130 was declined or that the custom application launcher 132 was deinstalled may be removed from the white list entries 124, in which case the next time the associated device 102 attempts to access the data network, the web page providing the control to select installation of the custom application launcher 130 will again be presented on the device 102.

In an embodiment, the white list entries 124 may comprise a quality of service field that indicates a quality of service level. The white list entry 124 associated with a device 102 that has installed the custom application launcher 132 may have a quality of service field that indicates a first quality of service level. The white list entry 124 associated with a device 102 that declined to install or has deinstalled the custom application launcher 130 may have a quality of service field that indicates a second quality of service level, where the second quality of service level is less than the first quality of service level.

It is understood that the system 100 may comprise any number of devices 102, BTSs 104, content servers 104, application servers 109, MAGs 118, and web servers 126. The data store 122 may comprise any number of white list entries 124, and the custom application launcher database 128 may comprise any number of custom application launchers 130.

Figure 3:
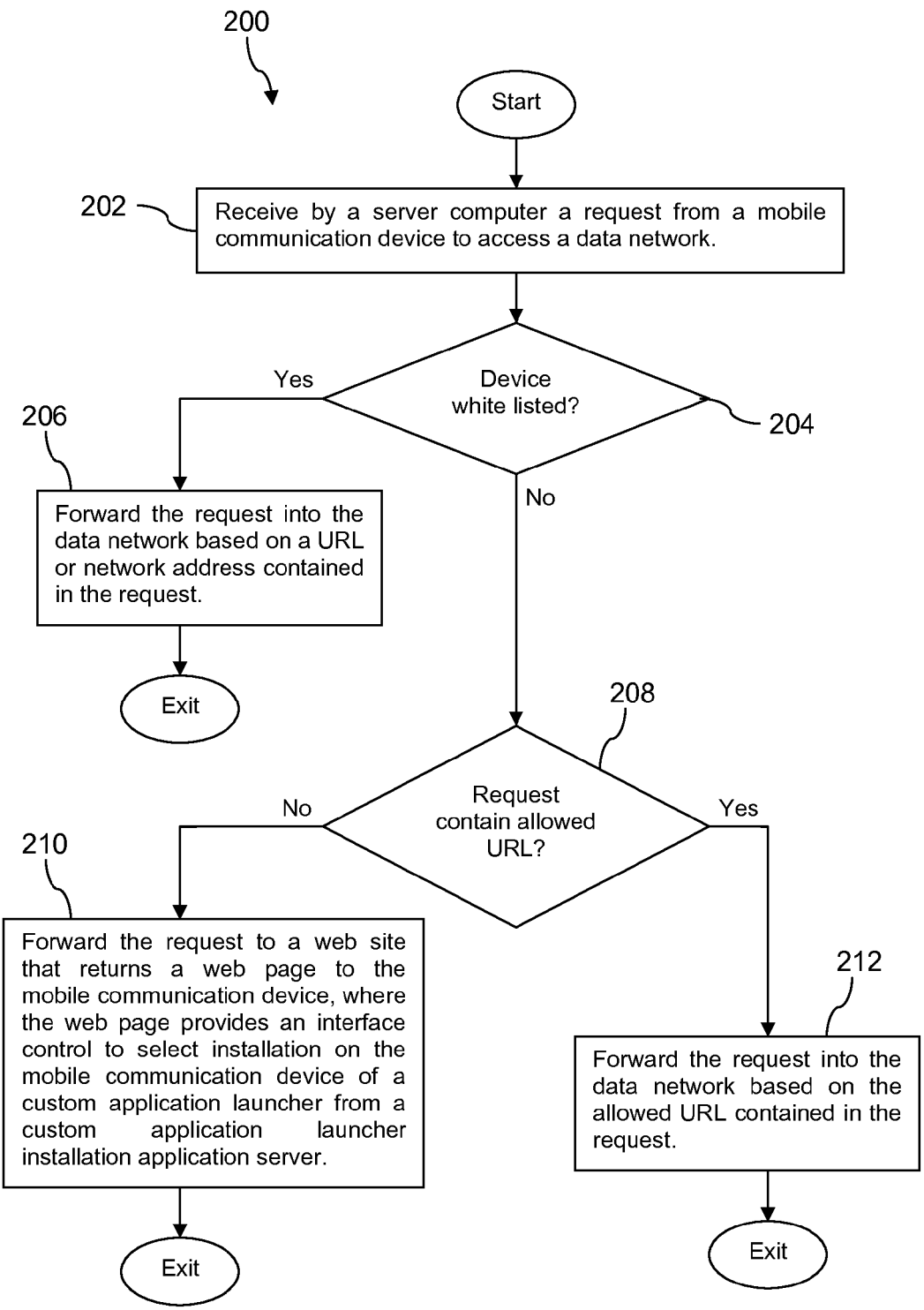
FIG. 3 is a flow chart of a method according to an embodiment of the disclosure.

Turning now to FIG. 3, a method 200 is described. At block 202, a server computer receives a request from a mobile communication device to access a data network. For example, the MAG 118 receives a request from the device 102 via the BTS 104 to access the network 106 (e.g., to access content and/or to receive web services). At block 204, it is determined whether the device is white listed. For example, the authorization application 120 searches the white list entries 124 for an entry corresponding to the device. If the device is white listed (e.g., if a white list entry 124 corresponding to the device 102 is found and if the entry is up to date), the processing proceeds to block 206 where the request for access to the data network is fulfilled based on a URL or network address contained in the request. If no entry corresponding to the device is found (or if the white list entry 124 associated with the device 102 is out-of-date), the process proceeds to block 208.

At block 208, if the request comprises an allowed or white listed URL, the processing proceeds to block 212, where the request for access to the data network is fulfilled. An allowed or white listed URL may be the URL of the web server 126 that provides access to the web page for selecting installation of the custom application launcher. An allowed or white listed URL may be the URL of an application store or customer care service supported by the wireless communication service provider. An allowed URL may reference one more web sites access to which is mandated by regulatory authorities. In an embodiment, an allowed or white listed URL may reference a custom application launcher installation application server At block 208, if the request comprises a disallowed URL, the process flows to block 210. At block 210, the request is forwarded to a web site that returns a web page to the mobile communication device, where the web page provides an interface control to select installation on the mobile communication device of a custom application launcher from a custom application launcher installation application server.

In an embodiment, various alternatives to the processing of block 210 may be implemented. In an embodiment, if the request comprises a disallowed URL, the request may be treated with a restricted access to the data network. Restricted access may comprise access being restricted to a limited portion of the data network (e.g., a limited portion of the Internet, for example a limited set of address domains), to a limited class of content, and/or a limited quality of service.

Figure 4A:
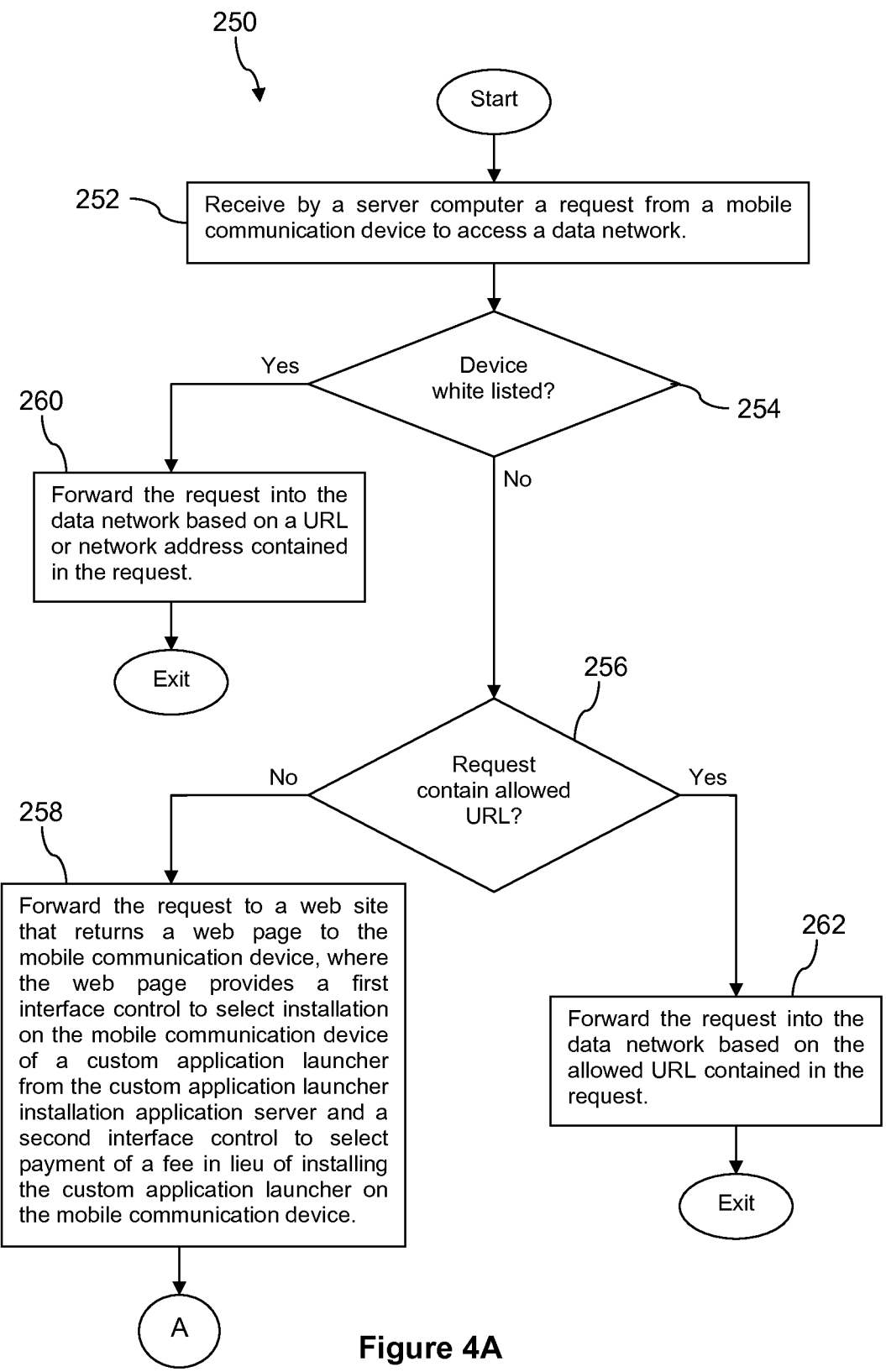
FIG. 4A and FIG. 4B are a flow chart of another method according to an embodiment of the disclosure.
Figure 4B:
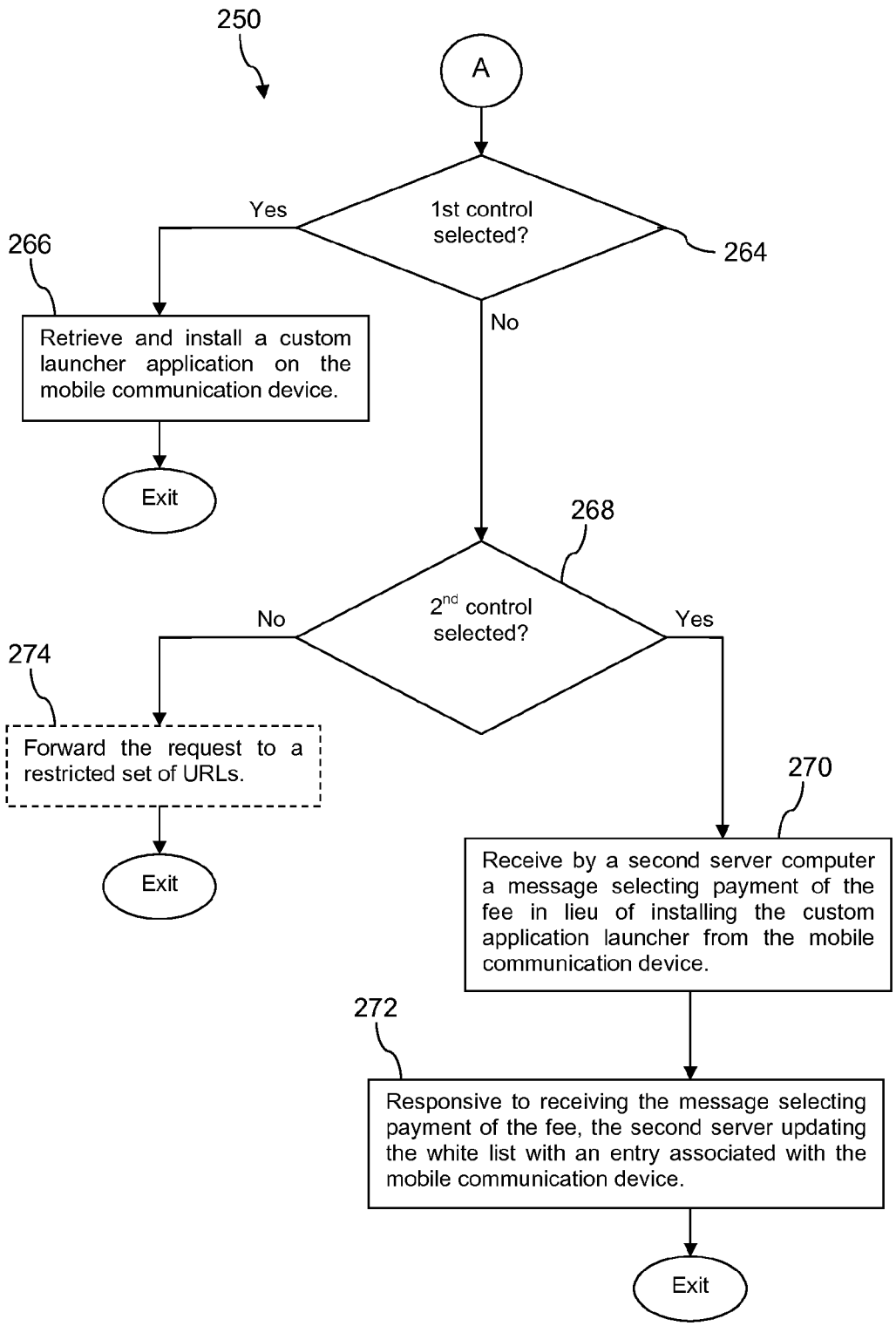

Turning now to FIG. 4A and FIG. 4B, a method 250 is described. The processing of blocks 252, 254, 256, 260, and 262 is substantially similar to the processing of blocks 202, 204, 208, 206, and 212 of method 200 described above with reference to FIG. 3. At block 256, if the request does not contain an allowed URL, the processing proceeds to block 258 where the server computer forwards the request to a web site that returns a web page to the mobile communication device, where the web page provides a first interface control to select installation on the mobile communication device of a custom application launcher from the custom application launcher installation application server and a second interface control to select payment of a fee in lieu of installing the custom application launcher on the mobile communication device.

At block 264, if the first control is selected by the mobile communication device, the processing proceeds to block 266 where a custom application launcher is retrieved (e.g., from the custom application launcher database 128) and installed on the mobile communication device. In an embodiment, the retrieval and installation of the custom application launcher may be promoted or assisted by the application server 109 or by the web server 126. Upon installation of the custom application launcher, the original request from the mobile communication device received in 252 may be re-queued and executed, for example fetching content identified in the original request and returning to the mobile communication device. Alternatively, the mobile communication device, after installation of the custom application launcher, may repeat the request to access the data network.

At block 264, if the first control is not selected, processing proceeds to block 268. At block 268, if the second control is selected, processing proceeds to block 270 where a second server computer receives a message (e.g., from the mobile communication device) selecting payment of the fee in lieu of installing the custom application launcher from the mobile communication device. At block 272, responsive to receiving the message selecting payment of the fee, the second server updates the white list with an entry associated with the mobile communication device. This entry in the white list may designate the mobile communication device as having chosen to pay the fee for accessing the data network without installing the custom application launcher. This information may be used to periodically verify that the fee payment is up-to-date. If the fee payment is out-of-date, the entry associated with the fee paying mobile communication device may be removed from the white list. After adding the entry for the mobile communication device to the white list, the original request from the mobile communication device received in 252 may be re-queued and executed, for example fetching content identified in the original request and returning to the mobile communication device. Alternatively, the mobile communication device, after installation of the custom application launcher, may repeat the request to access the data network.

At block 268, if the second control is not selected (hence, neither the first control or the second control is selected), in an embodiment the processing may proceed to block 274 where the request received in block 252 is forwarded to a restricted set of URLs in the data network, for example URLs associated with public service announcements, a wireless service provider's application store, a wireless service provider's self-help customer care web site and the like. In an embodiment, at block 274, a web page may be returned to the mobile communication device that provides a restricted access portal into the data network. The restricted access portal may provide a list of accessible web sites, such as a list of selected public service announcement web sites, a wireless service provider's application store, a wireless service provider's self-help customer care web site, one or more affiliate web sites (e.g., web sites associated with third parties that may pay the wireless communication service provider to grant access to mobile communication devices that opt out of installation of the custom application launcher). Alternatively, if at block 268 the second control is not selected, the processing may exit.

Figure 5:
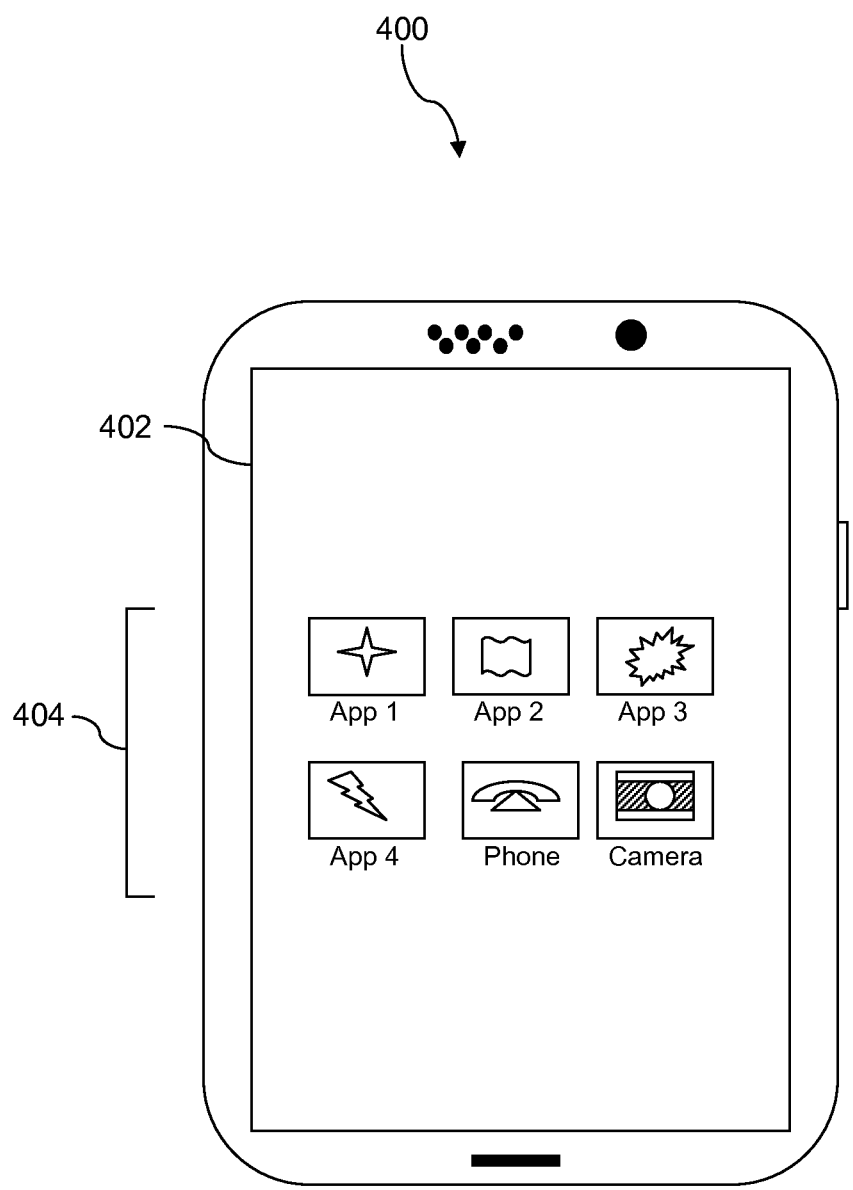
FIG. 5 is an illustration of a mobile communication device according to an embodiment of the disclosure.

FIG. 5 depicts a mobile communication device 400, which is operable for implementing aspects of the present disclosure, for example for implanting one or more embodiments of the mobile communication device 102 described above. Though illustrated as a mobile phone, the mobile communication device 400 may take various forms including a wireless handset, a pager, a personal digital assistant (PDA), a gaming device, or a media player. The mobile communication device 400 includes a touchscreen display 402 presenting exemplary application icons 404. The mobile communication device 400 may present options for the user to select, controls for the user to actuate, and/or cursors or other indicators for the user to direct. The mobile communication device 400 may further accept data entry from the user, including numbers to dial or various parameter values for configuring the operation of the handset. The mobile device 400 may further execute one or more software or firmware applications in response to user commands. These applications may configure the mobile communication device 400 to perform various customized functions in response to user interaction. Additionally, the mobile communication device 400 may be programmed and/or configured over-the-air, for example from a wireless base station, a wireless access point, or a peer mobile device 400. The mobile device 400 may execute a web browser application which enables the touchscreen display 402 to show a web page. The web page may be obtained via wireless communications with a base transceiver station, a wireless network access node, a peer mobile communication device 400 or any other wireless communication network or system.

Figure 6:
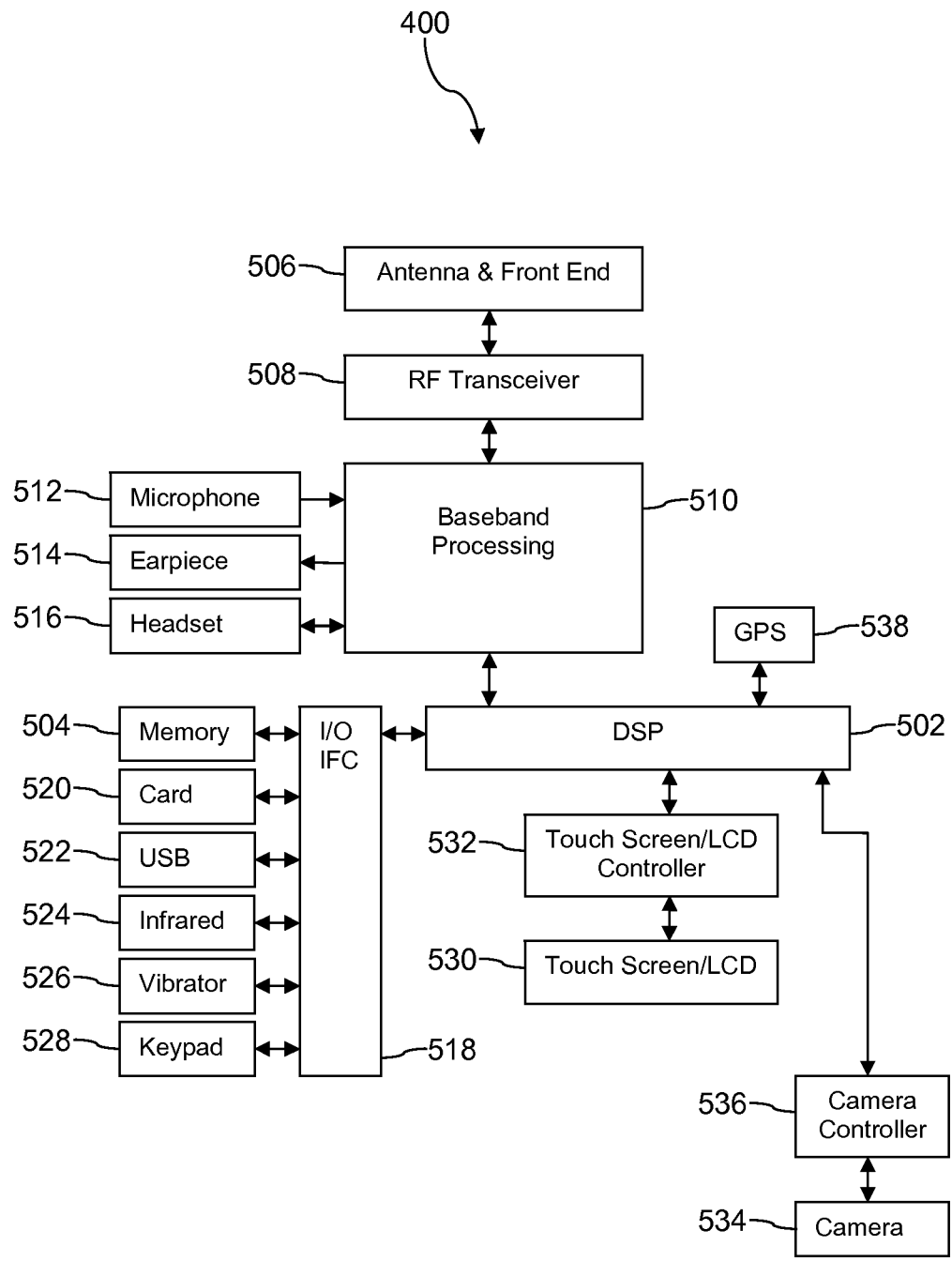
FIG. 6 is a block diagram of a hardware architecture of a mobile communication device according to an embodiment of the disclosure.

FIG. 6 shows a block diagram of a hardware architecture of the mobile communication device 400. While a variety of known components of handsets are depicted, in an embodiment a subset of the listed components and/or additional components not listed may be included in the mobile communication device 400. The mobile communication device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations. In an embodiment, the device 400 may comprise a near field communication (NFC) transceiver. The NFC transceiver may be used to complete payment transactions with point-of-sale terminals or other communications exchanges. In an embodiment, the device 400 may comprise a radio frequency identify (RFID) reader and/or writer device.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 7A:
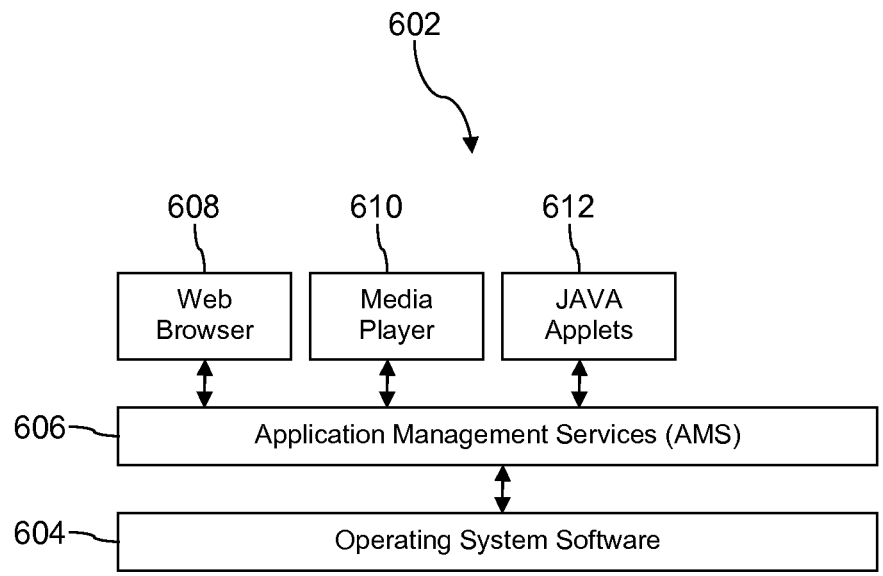
FIG. 7A is a block diagram of a software architecture of a mobile communication device according to an embodiment of a disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 7A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 7B:
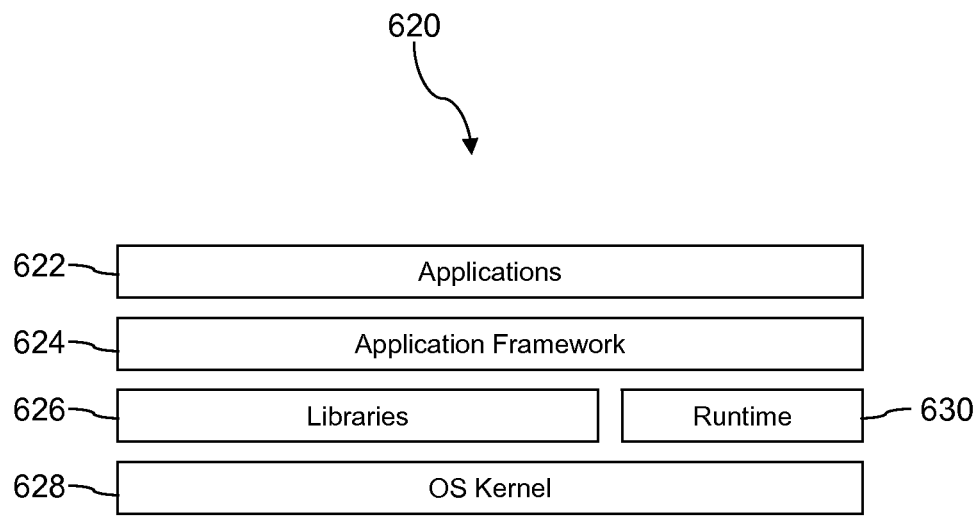
FIG. 7B is a block diagram of another software architecture of a mobile communication device according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
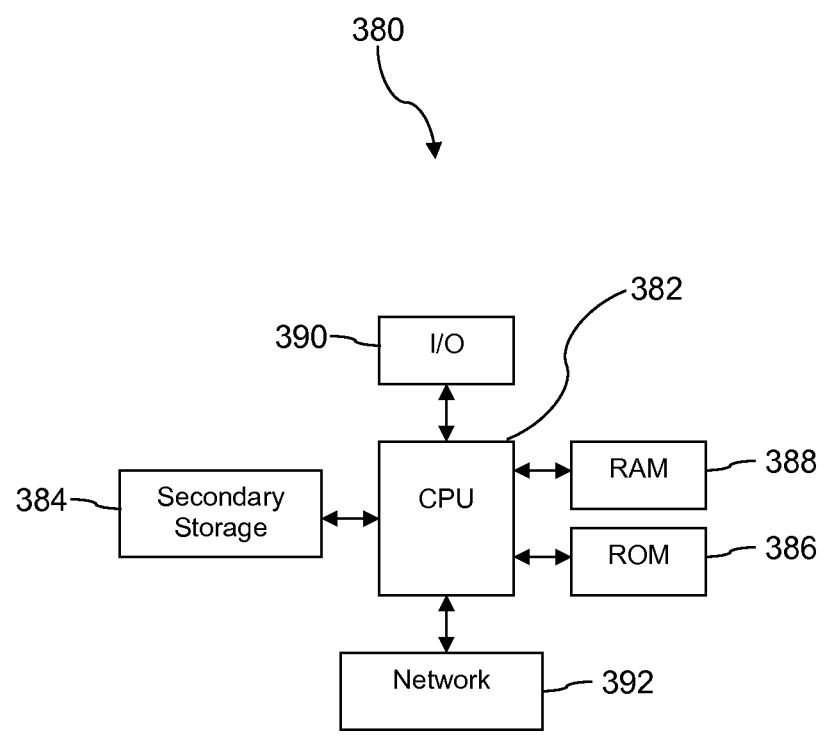
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing tiered access to a data network, comprising:

receiving by a server computer a request from a mobile communication device to access a data network;

comparing an identity associated with the mobile communication device to an access white list by the server computer, wherein the entry in the white list associated with the mobile communication device comprises an indication of a data network quality of service level that designates a diminished priority data network quality of service level for the mobile communication device;

responsive to not finding an entry associated with the mobile communication device in the access white list and determining that the request does not comprise a URL of a custom application launcher installation application server, the server computer forwarding the request to a web site that returns a web page to the mobile communication device, where the web page provides a first interface control to select installation on the mobile communication device of a custom application launcher from the custom application launcher installation application server and a second interface control to select payment of a fee in lieu of installing the custom application launcher on the mobile communication device;

receiving by a second server computer a message selecting payment of the fee in lieu of installing the custom application launcher from the mobile communication device; and responsive to receiving the message selecting payment of the fee, the second server updating the white list with an entry associated with the mobile communication device.

2. The method of claim 1, further comprising:

receiving by the second server computer a message selecting installation on the mobile communication device of the custom application launcher;

responsive to receiving the message selecting installation of the custom application launcher, downloading the custom application to the mobile communication device; and responsive to downloading the custom application launcher to the mobile communication device, updating the data network quality of service level of the white list entry associated with the mobile communication device to remove the designation of diminished priority.

3. The method of claim 2, further comprising:

receiving a message from the mobile communication device indicating removal of the custom application launcher from the mobile communication device; and removing the entry in the white list associated with the mobile communication device.

4. The method of claim 2, further comprising:

determining that the custom application launcher has been uninstalled on the mobile communication device based on failure of the mobile communication device to timely confirm continued installation of the custom application launcher; and responsive to determining the custom application launcher has been uninstalled on the mobile communication device, removing the entry in the white list associated with the mobile communication device.

* * * * *